United States Patent
Bilu et al.

(10) Patent No.: US 10,776,587 B2
(45) Date of Patent: Sep. 15, 2020

(54) CLAIM GENERATION

(71) Applicant: International Business Machines Corporation, Armonk, NY (US)

(72) Inventors: Yonatan Bilu, Jerusalem (IL); Ran Levy, Givatayim (IL); Noam Slonim, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 1023 days.

(21) Appl. No.: 15/206,326

(22) Filed: Jul. 11, 2016

(65) Prior Publication Data

US 2018/0012127 A1    Jan. 11, 2018

(51) Int. Cl.
*G06F 40/00* (2020.01)
*G06F 40/56* (2020.01)
*G06F 40/35* (2020.01)
*G06N 20/00* (2019.01)

(52) U.S. Cl.
CPC .............. *G06F 40/56* (2020.01); *G06F 40/35* (2020.01); *G06N 20/00* (2019.01)

(58) Field of Classification Search
CPC .................................................. G06F 17/2881
USPC .......................................................... 706/46
See application file for complete search history.

(56) References Cited

U.S. PATENT DOCUMENTS

| | | | | |
|---|---|---|---|---|
| 7,120,574 B2* | 10/2006 | Troyanova | ............ | G06F 40/242 704/9 |
| 7,668,791 B2* | 2/2010 | Azzam | .................... | G06F 40/30 706/45 |
| 8,671,341 B1 | 3/2014 | Hellwig et al. | | |
| 8,990,234 B1* | 3/2015 | Myslinski | .............. | G06N 20/00 707/758 |
| 10,220,945 B1* | 3/2019 | Myslinski | ............... | H04N 5/77 |
| 10,460,028 B1* | 10/2019 | Flann | .................... | G06F 40/253 |
| 2003/0004706 A1* | 1/2003 | Yale | ........................ | G06F 40/20 704/9 |
| 2011/0307435 A1* | 12/2011 | Overell | ................. | G06F 40/295 706/46 |
| 2012/0124467 A1 | 5/2012 | Harrington | | |
| 2012/0317046 A1* | 12/2012 | Myslinski | ............. | G06Q 10/10 705/329 |
| 2012/0330968 A1* | 12/2012 | Lee | ........................ | G06F 16/951 707/748 |

(Continued)

OTHER PUBLICATIONS

Hassan et al. "The quest for automate fact-checking", 2015, UTA, pp. 1-5. (Year: 2015).*

(Continued)

*Primary Examiner* — Hien D Khuu
(74) *Attorney, Agent, or Firm* — Ziv Glazberg

(57) ABSTRACT

A computer-implemented method, computerized apparatus and computer program product for claim generation, the method comprising: selecting at least one subject according to a given topic; selecting at least one verb from a first data source; selecting at least one object from a second data source; generating one or more candidate claim sentences, each of which composed of a subject selected from the at least one subject, a verb selected from the at least one verb and an object selected from the at least on object; and determining validity of the candidate claim sentences using a machine learning process.

18 Claims, 2 Drawing Sheets

(56) References Cited

U.S. PATENT DOCUMENTS

Figure 1:
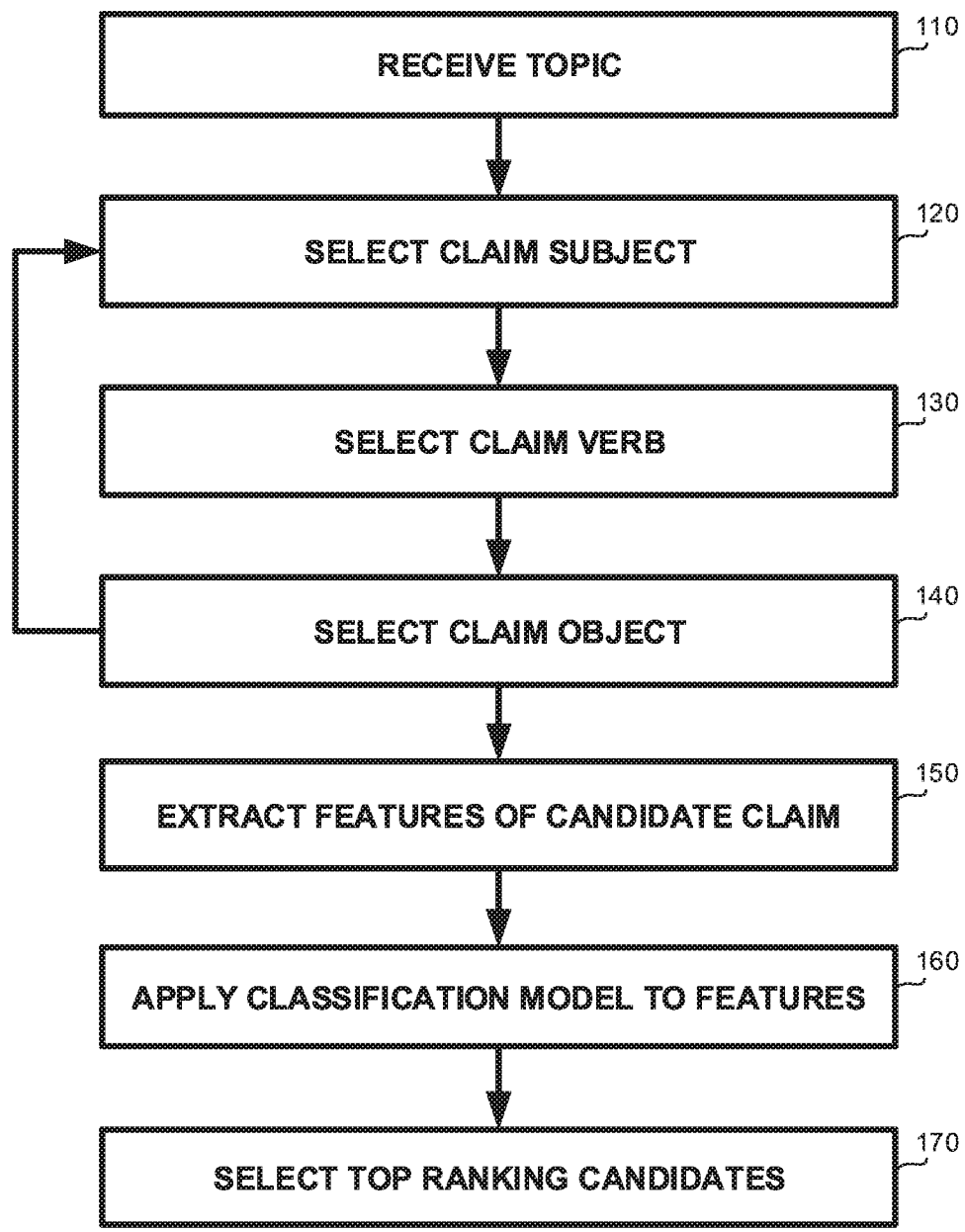

2015/0066895 A1* 3/2015 Komissarchik ....... G06F 16/345
707/709
2019/0102375 A1* 4/2019 Goulikar ............... G06F 16/313

OTHER PUBLICATIONS

Dictionary.com, Synthesize (Year: 2019).*
Catherine Blake., "Beyond genes, proteins, and abstracts: identifying scientific claims from full-text biomedical articles", Journal of Biomedical Informatics 43 (2010) 173-189.
Namhee Kwon et al., "Identifying and Classifying Subjective Claims", Proceeding dg.o '07 Proceedings of the 8th annual international conference on Digital government research: bridging disciplines & domains, pp. 76-81, 2011.
Marco Lippi and Paolo Torroni., "Context-Independent Claim Detection for Argument Mining", Proceeding IJCAI'15 Proceedings of the 24th International Conference on Artificial Intelligence, pp. 185-191, 2015.

* cited by examiner

CLAIM GENERATION

TECHNICAL FIELD

The present disclosure relates to cognitive computing in general, and to automatically synthesizing claims regarding arbitrary debate topics, in particular.

BACKGROUND

The field of cognitive computing deals with modelling and simulation of human thought processes and brain functions, e.g., how it senses, processes, or responds to stimuli, by a computer. One prominent example is the emerging science of computational argumentation, and in particular debating technology, aimed at exploring and mimicking how arguments that promote or contest a given proposition are recognized and used. This goal may be thought of as generalizing and extending the task of question answering to purviews such as decisions, opinions, points of view, or likewise contexts where, in contrast to factual inquiries, e.g., clues in a game show like "Jeopardy!", there are no "right" or "wrong" answers; rather, an argument's success, i.e., persuasiveness or compelling power, is measured by various factors such as evidentiary basis, logical consistency, perspective construction, eloquent delivery, and the like.

Debating technology can be used to assist humans in reasoning, decision making, or persuading of others, and may be employed in a wide range of industries and sectors, such as government, legal, finance, healthcare, or commerce, to name just a few. For example, automatic argument construction could serve to dramatically enhance business processes and decision making, whether by providing assisted reasoning for which treatment will work best on a patient, helping salespeople develop persuasive arguments when working with clients in deal negotiations, or presenting arguments in support of or against government policies.

BRIEF SUMMARY

One exemplary embodiment of the disclosed subject matter is a computer-implemented method comprising: selecting at least one subject according to a given topic; selecting at least one verb from a first data source; selecting at least one object from a second data source; generating one or more candidate claim sentences, each of which composed of a subject selected from the at least one subject, a verb selected from the at least one verb and an object selected from the at least on object; and determining validity of the candidate claim sentences using a machine learning process.

Another exemplary embodiment of the disclosed subject matter is computerized apparatus having a processor, the processor being adapted to perform the steps of: selecting at least one subject according to a given topic; selecting at least one verb from a first data source; selecting at least one object from a second data source; generating one or more candidate claim sentences, each of which composed of a subject selected from the at least one subject, a verb selected from the at least one verb and an object selected from the at least on object; and determining validity of the candidate claim sentences using a machine learning process.

Yet another exemplary embodiment of the disclosed subject matter is a computer program product comprising a non-transitory computer readable storage medium retaining program instructions, which program instructions when read by a processor, cause the processor to perform a method comprising: selecting at least one subject according to a given topic; selecting at least one verb from a first data source; selecting at least one object from a second data source; generating one or more candidate claim sentences, each of which composed of a subject selected from the at least one subject, a verb selected from the at least one verb and an object selected from the at least on object; and determining validity of the candidate claim sentences using a machine learning process.

THE BRIEF DESCRIPTION OF THE SEVERAL VIEWS OF THE DRAWINGS

Figure 2:
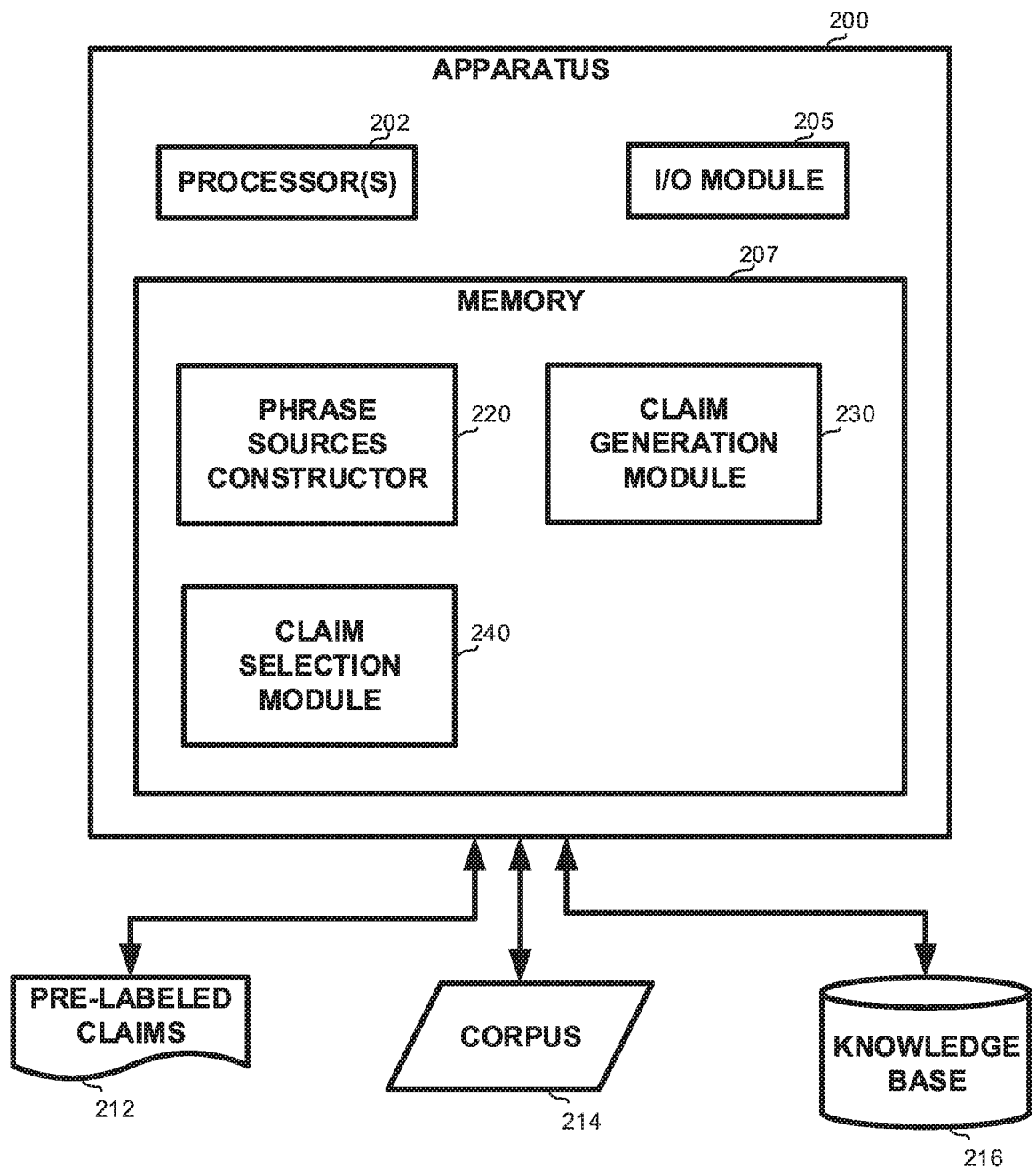

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 1 shows a flowchart diagram of a method, in accordance with some exemplary embodiments of the disclosed subject matter; and FIG. 2 shows a block diagram of an apparatus, in accordance with some exemplary embodiments of the disclosed subject matter.

DETAILED DESCRIPTION

A common element or building block in all models of arguments is the claim (or conclusion) being forwarded by the argument. Thus, when one is charged with the task of presenting arguments for or against a given controversial topic, a first step is to be able to present claims that are both coherent and relevant to that topic. One approach to such task is argument mining, wherein a given corpus is searched and analyzed in order to detect arguments therein and relations among them. Another approach is Natural Language Generation (NLG), wherein claims are synthesized using articulation of relations or hierarchies among entities in a knowledge base, such as used by recommender systems to explain their recommendations. However, both approaches depend heavily on the quality and quantity of data in the respective resources available. In NLG applications, the form and content of arguments are derived and determined by the specific knowledge base and thus are limited to the information present therein. Similarly, argument mining works well when the corpus is argument-rich and topic-related, but has shown to be challenging in a general setting.

One technical problem dealt with by the disclosed subject matter is to synthesize claims in an open domain. Given a certain topic, claims addressing it in a manner resembling debating among humans may be required to be generated artificially. The claims may be synthesized without using dedicated on-topic information resources, e.g., specific domain corpus or knowledge base. The generated claims may be simple sentences, composed of a subject, a verb and an object.

One technical solution is to reuse parts of existing claims, known to be valid in the context of one topic, for creating new claims regarding another topic, possibly unrelated to the former. This approach may be thought of as argument "recycling", based on the notion or observation that some portions, such as the predicate of a claim, i.e., what the claim says on the topic at hand, may be applicable to other topics as well. For example, if one is familiar with the claim "banning violent video games is a violation of free speech" in the context of the topic "banning violent video games", one could synthesize the claim "Internet censorship is a violation of free speech" when presented with the topic "Internet Censorship". Candidate claims generated in this manner may then be analyzed using machine learning techniques to determine which of these are valid, i.e., claims that are actually coherent and relevant to the new topic.

For illustrative purposes, the following claim sentences generated by one embodiment of the disclosed subject matter may be considered as positive examples:

Democratization contributes to stability.
Graduated response lacks moral legitimacy.
Truth and reconciliation commissions are a source of conflict.
The free market increases aggregate demand for goods and services in the economy.
Israel's 2008-2009 military operations violate multiple basic human rights.

In contrast, the following claim sentences may be considered as negative examples:

A global language leads to great exhaustion.
Blasphemy is a public health issue, not a criminal matter.
Nuclear weapons cause lethal lung cancer.
Hydroelectric dams are more expensive than younger ones.
Intellectual property rights are an expression of reproductive rights.

Some instances may be more difficult to label, such as the following questionable or inconclusive examples:

Gambling is unethical and unjust.
The free market is a free choice.
A big and beefy government is one of the world's most repressive and abusive regimes.
Anarchism is necessary for political freedom.
Cannabis is not victimless.

In some exemplary embodiments, a candidate claim sentence may be generated by selecting a claim subject based on a topic specified, selecting a claim verb from a first data source, and selecting a claim object from a second data source. A subject may be chosen by analyzing the text of the topic to extract all noun phrases therein. The extracted nouns may be cross-checked by searching for matching entries in a given corpus, such as Wikipedia™, for example, available at en.wikipedia.org/. The list may be expanded to related concepts, either via language resources such as Wordnet™, available at wordnet.princeton.edu/, through use of analytical methods such as word embedding, or the like. A verb may be selected from a predefined list, which in turn may be generated by traversing a collection of claims already known to be valid, i.e., pre-labeled, and extracting verbs therefrom. The collection of extracted verbs may be expanded similarly as described above. The pre-labeled claims may be detected manually or in a semi-automatic manner. An object phrase may be selected from one or several non-exclusive types of sources. One exemplary source may be a predefined list of objects generated by traversing a set of pre-labeled claims and extracting the objects therefrom, similarly as described above. Another exemplary source may be a collection generated by applying claim detection for multiple topics on a corpus and extracting the objects from the claims thus detected. Yet another exemplary source may be concepts detected as relevant to the topic, e.g., by using an appropriate knowledge base. Yet another exemplary source may be objects mined in a corpus based on some predetermined criteria, such as, for example, objects appearing as argumentative in nature, for containing argumentative words or the like.

In some exemplary embodiments, a plurality of candidate claims may be generated automatically and tested for validity using machine learning techniques. One or more features may be extracted from each candidate claim. A trained classification model may be applied on the extracted features to obtain a predicted label, i.e., "valid" or "invalid". The features may include measures relating to similarity among constituents of the candidate claim and the given topic, such as, for example, similarity between the candidate claim's predicate, i.e., verb and object, and the given topic, or between portions of either of them, similarity between the candidate claim's subject and the given topic, similarity between the candidate claim's subject and the given topic, similarity between constituents of the candidate claim and a topic to which a claim that the candidate claim's predicate has been selected therefrom originally related, or the like. Additionally or alternatively, the features may include measures relating to co-occurrence among constituents of the candidates. For example, one feature may be a count of the number of times that the candidate claim appears, in whole or in part, within a corpus. Similarly, another feature may be a count of co-occurrences of the subject and the object (or constituent terms thereof, where applicable) in a sentence.

In some exemplary embodiments, the candidate claims determined as valid may be ranked based on a numeric score assigned to each by the classification module and the top ranked valid claims may be outputted.

In the context of the present disclosure, the term "topic" may be understood as referring to the topic under consideration, for which claims may be sought; the term "subject" may be understood as being used in its grammatical sense, i.e., the subject of a sentence, specifically, of a claim; the term "verb" may be understood as referring to the verb in a sentence; and the term "object" may be understood as being used also in its grammatical sense, i.e., the object of a sentence.

As an illustrative example, assume one is interested in finding pro and con arguments on plant-based diet. A plausible definition for the topic in such case may be "vegetarianism", "vegan diet", or the like. A possible pro argument may be presented in the form of the claim sentence "meat is murder", where the phrase "meat" is the subject, "is"—the verb, and "murder"—the object. Similarly, a possible con argument may be presented by the claim sentence "processed vegetarian protein increases greenhouse gas pollution", where "processed vegetarian protein" is the subject, "increases" is the verb, and "greenhouse gas pollution" is the object. It will be appreciated that both arguments may be considered as valid claims, merely for being coherent and relevant to the afore—said topic, regardless of their merit as truthful or persuasive.

Referring now to FIG. 1 showing a flowchart diagram of a method, in accordance with some exemplary embodiments of the subject matter.

On Step 110, a topic for which claims are required to be generated may be received. The topic may be specified by a user, obtained from a resource such as Debatabse™, available at idebate.org/database, or the like.

On Step 120, a claim subject may be selected in accordance with the topic received in Step 110. The subject may be selected from a list generated by analyzing the topic to extract noun phrases. The list may be filtered by searching for matching entries in a given corpus or knowledge base. Additionally or alternatively, the list may be extended by detecting related concepts in a respective data source. In some exemplary embodiments, the subject may also simply be the topic itself.

On Step 130, a claim verb may be selected from a first data source, such as a predefined list of verbs extracted from a set of pre-labeled claims, for example. The list may be filtered and/or expanded similarly as described above.

On Step 140, a claim object may be selected from a second data source, such as a list of objects extracted from a set of pre-labeled claims and/or from claims detected in a corpus, concepts detected in a knowledge base as being related to the topic, objects mined from a corpus based on meeting some condition, or any combination thereof.

In some exemplary embodiments, Steps 130 to 140 may be performed concurrently, such as, for example, by selecting both the verb and object from predicates of pre-labeled claims. The selection may be based on a measure of similarity between each of these predicates and the received topic. The pre-labeled claims may be associated each with a topic for which the claim was originally detected, where in case of identity with the received topic, the predicate may be excluded from selection.

Steps 120 to 140 may be repeated multiple times, whereby a plurality of candidate claim sentences composed of a subject, a verb and an object may be generated.

On Step 150, one or more features may be extracted from each candidate claim generated on Steps 120 to 140. The extracted features may comprise numeric features, such as, for example, number of words or the like. In some exemplary embodiments, the extracted features may comprise one or more measures of similarity among constituents of a candidate claim and the topic received, such as, for example, similarity between the subject, as selected in Step 120, and the topic or sub-phrases thereof; similarity between the object or the predicate, i.e., verb and object as selected on Steps 130 to 140, and the topic or sub-phrases thereof; or the like. Additionally or alternatively, the extracted features may comprise similarity between the subject and/or predicate and the topic from which the predicate originated, where applicable. It will be appreciated that a low degree of similarity between the predicate and originating topic may indicate a high level of generality, e.g., in what is stated by that predicate about a subject, which may make it more amenable to generation of claims. The similarity between text segments may be calculated using word embedding. In some exemplary embodiments, the extracted features may comprise one or more frequency or co-occurrence measures of a candidate claim or its components in a data source, such as, for example, the frequency at which a claim appears, in whole or in part, in a given corpus; the co-occurrence level of the subject in sentences containing many of the object terms; the frequency at which the predicate appears in exemplary valid or invalid claim collections; the frequency at which the verb appears in a given list of "causation verbs"; or the like.

On Step 160, a classification model may be applied to features extracted from a candidate claim on Step 150 to obtain a prediction of validity for the candidate claim. The classification model may be trained beforehand using supervised learning, where a collection of candidate claims may be generated for one or more chosen topics and provided to a group of people for labeling each as either a positive (valid claim) or negative (invalid claim) example. In some exemplary embodiments, the classification model may be employed to obtain a score for each candidate claim, whereby candidates may be ranked. For example, the classification model may use logistic regression or likewise methods that estimate probability of a predicted outcome.

On Step 170, the candidate claims labeled as valid in Step 160 may be filtered based on their ranking and the selected candidates may be provided as output. In some exemplary embodiments, the selection may be of the top ranking candidates up to a predetermined total number, above a predetermined score, or likewise filtering criteria. Additionally or alternatively, in case the fraction of valid candidates as determined on Step 160 is less than a predetermined threshold, none of them may be selected.

Referring now to FIG. 2 showing an apparatus in accordance with some exemplary embodiments of the disclosed subject matter. An Apparatus 200 may be configured to automatically generate and evaluate relevancy of claims for an arbitrary topic, in accordance with the disclosed subject matter.

In some exemplary embodiments, Apparatus 200 may comprise one or more Processor(s) 202. Processor 202 may be a Central Processing Unit (CPU), a microprocessor, an electronic circuit, an Integrated Circuit (IC) or the like. Processor 202 may be utilized to perform computations required by Apparatus 200 or any of it subcomponents.

In some exemplary embodiments of the disclosed subject matter, Apparatus 200 may comprise an Input/Output (I/O) module 205. I/O Module 205 may be utilized to provide an output to and receive input from a user, such as define topics, annotate claims with training labels, review results, or the like.

In some exemplary embodiments, Apparatus 200 may comprise Memory 207. Memory 207 may be a hard disk drive, a Flash disk, a Random Access Memory (RAM), a memory chip, or the like. In some exemplary embodiments, Memory 207 may retain program code operative to cause Processor 202 to perform acts associated with any of the subcomponents of Apparatus 200.

In some exemplary embodiments, Apparatus 200 may be in communication with one or more data sources, such as Pre-Labeled claims 212, Corpus 214, Knowledge Base 216, or the like. Pre-Labeled claims 212 may comprise exemplary claim sentences detected either by humans or by computerized means. Corpus 214 may comprise a body of textual resources, e.g., articles on one or more topics, or the like. Knowledge Base 216 may comprise structured information pertaining some topic.

Phrase Sources Constructor 220 may be configured to construct one or more sources of reusable claim phrases or sentence parts. These sources may comprise, for example, a predefined list of verbs, a collection of objects, a list of subjects presumably related to a specified topic, or the like. Phrase Sources Constructor 220 may utilize data contained in or extracted from any one of data sources 212 to 216, and/or the text of the received topic, as its input. In some exemplary embodiments, Phrase Sources Constructor 220 may be configured to construct during a pre-processing stage a collection of predicates that may be employed for the synthesis of new claims.

Claim Generation Module 230 may be configured to generate a list of candidate claims for a given input topic. Claim Generation Module 230 may be configured to select a subject, a verb, and/or an object, similarly as in Steps 120 to 140 of FIG. 1. Claim Generation Module 230 may select the subject, verb, and/or object from data sources constructed by Phrase Sources Constructor 220. Claim Generation Module 230 may repeat selection of either phrase multiple times to generate a plurality of claim candidates. In some exemplary embodiments, Claim Generation Module 230 may be configured to select a plurality of predicates from a collection, such as may be constructed by Phrase Sources Constructor 220, in accordance with the topic received, e.g., by computing a measure of similarity between the topic and each of the predicates, and taking the top ranking ones.

Claim Selection Module 240 may be configured to select from a list of candidate claims, such as those generated by Claim Generation Module 230, the ones that are likely to be valid, i.e., relevant to a topic at hand. Claim Selection Module 240 may be configured to apply statistical machine learning techniques to determine validity of candidate claims. Claim Selection Module 240 may extract one or more features from each candidate claim and provide these features to a trained classification model to obtain a predicted label, similarly as in Steps 150 to 160 of FIG. 1. In some exemplary embodiments, a feature may be calculated utilizing one or more of data sources 212 to 216 and/or the input topic. For example, one feature may be the similarity between the candidate claim's predicate and the list of n-grams presumably related to the topic, based on the n-grams' frequency in a given corpus. The list of n-grams may be derived from a list of subjects such as constructed by Phrase Sources Constructor 220. In some exemplary embodiments, Claim Generation Module 230 may be configured to rank the claim candidates determined as valid and output the top ranked candidates, similarly as in Step 170 of FIG. 1. The ranking may be obtained using the same machine learning process employed for predicting validity, e.g., a logistic regression classifier or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   selecting at least one subject according to a given topic;
   selecting at least one verb from a first data source;
   selecting at least one object from a second data source different from the first data source;
   automatically synthesizing one or more automatically-generated candidate claim sentences, comprising combining for each automatically-generated candidate claim sentence: a subject selected from the at least one subject, a verb selected from the at least one verb and an object selected from the at least one object; and
   determining validity of the candidate automatically-generated claim sentences using a machine learning process, comprising applying a trained classifier on one or more features extracted from a candidate claim sentence selected from the automatically-generated candidate claim sentences, to obtain a predicted validity labeling, the predicated validity labeling referring to the coherency and relevancy to the given topic.

2. The computer-implemented method of claim 1, wherein said selecting at least one subject comprises analyzing the given topic to extract one or more noun phrases.

3. The computer-implemented method of claim 1, wherein the first data source is selected from the group consisting of: verbs extracted from a set of pre-labeled claim sentences; predetermined causation verbs; and any combination thereof.

4. The computer-implemented method of claim 1, wherein the second data source is selected from the group consisting of: objects extracted from a set of pre-labeled claim sentences; objects extracted from a set of claim sentences detected in a corpus; concepts related to the given topic in a knowledge base; objects mined from a corpus based on predetermined criteria; and any combination thereof.

5. The computer-implemented method of claim 1, wherein the trained classifier is trained using a training dataset comprising pre-labeled claim sentences.

6. The computer-implemented method of claim 1, wherein at least one of the features relates to similarity between constituents of the candidate claim sentence and the given topic.

7. The computer-implemented method of claim 1, wherein at least one of the features relates to co-occurrence of constituents of the candidate claim sentence within a corpus.

8. The computer-implemented method of claim 1, wherein the first and second data sources comprise a same set of pre-labeled claim sentences associated each with a topic, wherein a verb and an object of a candidate claim sentence are selected from a same pre-labeled claim sentence of the set, wherein at least one of the features relates to similarity between constituents of the pre-labeled claim sentence and associated topic thereof.

9. The computer-implemented method of claim 1, further comprising: using the machine learning process to rank candidate claim sentences determined as valid, and outputting a top ranked subset thereof.

10. A computerized apparatus having a processor, the processor being adapted to perform the steps of:
    selecting at least one subject according to a given topic;
    selecting at least one verb from a first data source;
    selecting at least one object from a second data source different from the first data source;
    automatically synthesizing one or more automatically-generated candidate claim sentences, comprising combining for each automatically-generated candidate claim sentence: a subject selected from the at least one subject, a verb selected from the at least one verb and an object selected from the at least one object; and
    determining validity of the candidate automatically-generated claim sentences using a machine learning process, comprising applying a trained classifier on one or more features extracted from a candidate claim sentence selected from the automatically-generated candidate claim sentences, to obtain a predicted validity labeling, the predicated validity labeling referring to the coherency and relevancy to the given topic.

11. The computerized apparatus of claim 10, wherein said selecting at least one subject comprises analyzing the given topic to extract one or more noun phrases.

12. The computerized apparatus of claim 10, wherein the first data source is selected from the group consisting of:

verbs extracted from a set of pre-labeled claim sentences: predetermined causation verbs; and any combination thereof.

13. The computerized apparatus of claim 10, wherein the second data source is selected from the group consisting of: objects extracted from a set of pre-labeled claim sentences; objects extracted from a set of claim sentences detected in a corpus; concepts related to the given topic in a knowledge base: objects mined from a corpus based on predetermined criteria; and any combination thereof.

14. The computerized apparatus of claim 10, wherein at least one of the features relates to similarity between constituents of the candidate claim sentence and the given topic.

15. The computerized apparatus of claim 10, wherein at least one of the features relates to co-occurrence of constituents of the candidate claim sentence within a corpus.

16. The computerized apparatus of claim 10, wherein the first and second data sources comprise a same set of pre-labeled claim sentences associated each with a topic, wherein a verb and an object of a candidate claim sentence are selected from a same pre-labeled claim sentence of the set, wherein at least one of the features relates to similarity between constituents of the pre-labeled claim sentence and associated topic thereof.

17. The computerized apparatus of claim 10, wherein said processor is further configured for using the machine learning process to rank candidate claim sentences determined as valid, and outputting a top ranked subset thereof.

18. A computer program product comprising a non-transitory computer readable storage medium retaining program instructions, which program instructions when read by a processor, cause the processor to perform a method comprising:

selecting at least one subject according to a given topic;

selecting at least one verb from a first data source;

selecting at least one object from a second data source different from the first data source;

automatically synthesizing one or more automatically-generated candidate claim sentences, comprising combining for each automatically-generated candidate claim sentence: a subject selected from the at least one subject, a verb selected from the at least one verb and an object selected from the at least one object; and determining validity of the candidate automatically-generated claim sentences using a machine learning process, comprising applying a trained classifier on one or more features extracted from a candidate claim sentence selected from the automatically-generated candidate claim sentences, to obtain a predicted validity labeling, the predacated validity labeling referring to the coherency and relevancy to the given topic.

* * * * *